United States Patent Office 3,104,241
Patented Sept. 17, 1963

3,104,241
DERIVATIVES OF INDOLE
Hans Joachim Enenkel, Darmstadt, Heinrich Müller, Pfungstadt, and Karl Schulte, Darmstadt, Germany, assignors to E. Merck Aktiengesellschaft, Darmstadt, Germany, a corporation of Germany
No Drawing. Filed Apr. 5, 1961, Ser. No. 100,817
Claims priority, application Germany Apr. 9, 1960
14 Claims. (Cl. 260—247.2)

This invention is directed to new derivatives of indole, more particularly, to those of octahydroindole. The new derivatives possess outstanding spasmolytic activity.

Accordingly, it is among the principal objects of this invention to provide the aforesaid new derivatives of octahydroindole; and methods of preparing same.

The new octahydroindole compounds of this invention have the following Formula I:

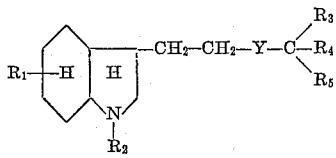

wherein:

$R_1$ designates hydrogen, halogen, OH, alkyl having at the most 5 carbon atoms, methoxy or ethoxy;

$R_2$ designates alkyl having at the most 4 carbon atoms; and also aminoalkyl of the same carbon content, as for example, dimethylaminoethyl;

$R_3$, $R_4$ and $R_5$ may be similar or dissimilar and designate an aryl residue or group having at most 8 carbon atoms, i.e., an alkylated phenyl radical, e.g. —$C_6H_4.CH_3$, —$C_6H_3(CH_3)_2$ or —$C_6H_4.C_2H_5$, which optionally may contain as substituents, Cl, Br or F; or an alkyl or alkylene residue or radical having at most 6 carbon atoms, two of which residues may be linked together, optionally through a nitrogen atom; or a cycloalkyl group or radical having at most 8 carbon atoms, i.e., an alkylated cyclohexyl radical, akin to the alkylated phenyl radical, supra; or a 5- or 6-membered heterocycle containing N—, O— and/or an S atom, and wherein one of the substituents $R_3$ through $R_5$ may also be H, Cl, Br or OH.

Y designates —O—CO—, —O—, —O—$CH_2$— or —NH—CO—.

The new compounds of this invention also include the acid addition salts (of pharmaceutically acceptable acids), the quaternary ammonium compounds and the amine oxides of the foregoing compounds of Formula I.

The compounds of this invention may be prepared by a variety of methods. For example, (a) An indole derivative, i.e., an octahydroindole derivative of Formula II

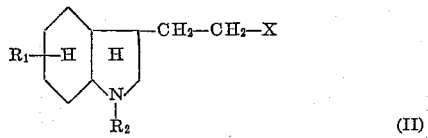

wherein $R_1$ and $R_2$ have the significance defined above and wherein X designates OH, O-alkalimetal, halogen, O-acyl having at most 5 carbon atoms, $NH_2$ or a group replaceable by an ether group, advantageously a sulfonic acid group, can be reacted with a substituted acetic acid of Formula III

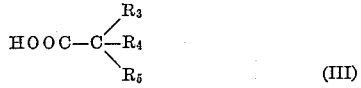

wherein $R_3$, $R_4$ and $R_5$ have the above designated significance, or with a reactive derivative of Formula III or a halogen compound of Formula IV

wherein $R_3$, $R_4$ and $R_5$ have the above designated significance; and

Z designates halogen or halogen-$CH_2$-(halogenomethyl).

(b) Converting a compound having the structure of Formula I which contains a double bond in the 2,3 position and/or in the benzene nucleus by hydrogenation into the corresponding octahydroindolyl compounds.

(c) It is also possible to convert a compound having the basic structure of Formula I but devoid of one or more of the substituents $R_1$ through $R_5$ by introducing therein, the absent substituents $R_1$ through $R_5$ or when substituents in the positions of $R_1$ through $R_5$ are different to substitute the desired substituents $R_1$ through $R_5$ in lieu of those occupying such positions.

(d) If it is desired, for example, to prepare water soluble derivatives, one can start with a compound of Formula I and convert it by reacting the nitrogen atom of the indole nucleus or other nitrogen atoms of the compound by treatment with an acid into the corresponding acid addition salt or into a quaternary ammonium compound or, by oxidation convert the compound of Formula I into the corresponding amine oxide.

REACTION A

The preparation of compounds of Formula I wherein Y designates —O—CO— can be carried out by known esterification procedures. In such instances the substituent X of the indolyl component preferably designates OH, halogen or O-acyl. The acetic acid component of Formula III can be employed in the form of the free acid, a salt thereof, an anhydride thereof, an acid halogenide thereof or a suitable ester for transesterification. When the conversion by usual esterification procedures is carried out, as by the interaction of an alcohol with an acid, it is advantageous to carry out the esterification in the presence of a water-binding agent, as for example, concentrated sulfuric acid or hydrogen chloride. When the reactants are a compound of Formula III, wherein X designates OH and an acid halogenide of Formula III, a basic substance can be included as an acid binding agent. When esterifying an indole derivative of Formula II (when X designates OH) with an anhydride of an acid of Formula III in accordance with usual methods, it is advantageous to carry out the esterification reaction in the presence of a tertiary base, as for example, pyridine, and at an elevated temperature.

Reaction A can also be achieved by transesterification. Such transesterification can be carried out by three different methods. Thus one can:

(1) React an indole derivative of Formula II (wherein X is OH) with an ester of an acid of Formula II, or
(2) React an indole derivative of Formula II (wherein X designates acyloxy) with a free acid of Formula II, or
(3) React the indole derivative with an ester of an acid of Formula III.

Particularly suitable for tranesterification in accordance with above reaction 1 are lower alkyl esters of acids of Formula III. The reaction is carried out in the presence of alkaline agents, as for example, alcoholates, alkali metals, alkali metal hydroxides or sodium hydride. The lower aliphatic alcohol thus formed may be removed from the reaction mixture by distillation.

When the reaction is carried out in accordance with method 2, the liberated acid may be removed from the reaction mixture by distillation. Solvents such as Decalin may be employed.

In carrying out reaction 3, one can use esters of acids having a Formula III, preferably a lower alkyl ester thereof and a solvent such as Decalin. An alkaline catalyst is desirable as for example, a sodium alcoholate, sodium hydride or an alkali metal.

Reaction A may also be carried out by reacting an indole derivative of Formula II wherein X is a halogen, as for example, chlorine with an acid of Formula III or a salt of such acid (as for example, an alkali metal salt). In such instances, the reaction is advantageously carried out in the presence of a solvent, such as toluene or benzene.

For the preparation of the acid amides of Formula I (wherein Y designates —NH—CO—), various processes may be employed. For example, a compound of Formula II (wherein X designates $NH_2$) can be reacted with a substituted acetic acid of Formula II or a suitable reactive derivative thereof.

It is advantageous to use an acid halogenide and carry out the reaction in an inert solvent, as for example, benzene or hexane, preferably at substantially elevated temperature. If a less reactive ester is employed in lieu of the halogenide, as for example, the methyl or ethyl ester, it is best to carry out the reaction at elevated temperature and optionally in a closed vessel.

When preparing compounds of Formula I wherein Y is —O— or —O—$CH_2$—, one can utilize all processes employed in forming ethers. The Williamson ether synthesis is an advantageous method. In such instances, an alkali metal compound of the alcohol (Formula II, wherein X is O-alkali metal) is reacted with a slight excess of an halogenide of Formula IV (preferably the chloro or bromo compound). The reaction is best carried out at elevated temperature and optionally in a closed vessel. When particularly reactive halogenides are used, as for example, benzhydrylbromide, it is desirable to boil the components for several hours in an inert solvent, as for example, toluene in the presence of potassium carbonate. When the esterification is carried out with basic alcohols in the form of salts thereof, as for example, a hydrochloride, it is advantageous to add to the reaction mixture about 1–1.2 mols. of an acid binding agent, as for example, a sodium alcoholate or potassium hydroxide.

REACTION B

For the preparation of a compound of Formula I, one can start with the corresponding compound which contains double bonds in the 2,3-position of the indole nucleus and/or in the benzene nucleus and hydrogenate the same. In such instances, the reaction is advantageously carried out in methanol solution and optionally with the addition of hydrogen chloride. It is best to carry out the reaction at a pressure of from about 6 atmospheres and under a temperature of about 60° C. in the presence of a precious metal catalyst, as for example, platinum or platinum oxide.

REACTION C

It is also possible in accordance with this invention to start with a compound having the basic structure of Formula I, wherein one or more of the substituents $R_1$ through $R_5$ is absent; and to introduce such substituents in accordance with usual methods. For example, if one starts with an ester of Formula I which is devoid of a substituent on the indole nitrogen atom, to alkylate the same. Suitable alkylating agents are, for example, an alkyl or arylalkyl halogenide, as for example, ethyl bromide, propyl chloride or benzyl chloride and optionally to carry out the reaction in the presence of condensation agents, such as, for example, sodium amide or sodium hydride. A compound of Formula I can also be reacted with an aldehyde, as for example, acetaldehyde, benzaldehyde or other suitable, reactive derivative of such aldehyde, such reaction taking place at the nitrogen atom of the indole nucleus. In this way, there is obtained the corresponding aldehyde ammonia derivative or the related ene-amine. The resultant OH group in the aldehyde ammonium synthesis intermediate can finally be substituted by a hydrogen atom in accordance with usual hydrogenolysis. Likewise, the formed double bond of the ene-amine can be hydrogenated.

In accordance with reaction C, it is further possible to convert a compound of Formula I which, in lieu of the substituents $R_1$ through $R_5$ contain undesired substituents in those positions into compounds having the desired substituents $R_1$ through $R_5$. For example, when in a compound of Formula I, wherein $R_3$ is $C_6H_5$ and $R_4$ and $R_5$ together designate an oxygen atom, such oxygen can be converted by means of usual Grignard reaction into a hydroxyl group with simultaneous introduction of a desired or suitable halogenated hydrocarbon radical, or a heterocyclic residue.

REACTION D

It is further possible in accordance with this invention to convert a compound in accordance with Formula I into the acid addition salt by treatment with an acid. By such a reaction, it is possible in case the compound contains one or more nitrogen atoms in the molecule to obtain mono- or di-acid addition salts. For preparation of the acid addition salts, one may use fundamentally all the suitable acids which yield physiologically suitable acid addition salts, as for example, hydrochloric acid, sulfuric acid, or orthophosphoric acid, acetic acid, propionic acid, butyric acid, maleic acid, fumaric acid, tartaric acid, citric acid, ascorbic acid, malonic acid, succinic acid or methanesulfonic acid.

A compound in accordance with Formula I can be quaternized at the indole nitrogen or at another position in the molecule where another nitrogen atom is present. For this purpose, there may be used any of the suitable quaternizing compounds, as for example, alkyl- or arylalkyl halogenides, dialkyl sulfates, etc.

For preparation of the amine oxides of compounds of Formula I, one can use, for such reaction, the usual oxidizing methods employing tertiary amines by treatment with hydrogen peroxide or peracids, as for example, mono-perphthalic acid, perbenzoic acid, etc.

When the starting material in accordance with the invention is a compound having an indole component of Formula II, wherein X designates OH, the starting material can be prepared by the conversion of the corresponding substituted phenyl hydrazine with omega-hydroxy butyraldehyde and subsequent hydrogenation.

The new compounds of this invention are spasmolytics which may be used in human therapy. They may be put up in all forms for pharmaceutical preparations, as for example, tablets, pills, dragees, suppositories, emulsions, suspension solutions and injectable solutions. In this connection, there can be used the customary supplementary agents such as tabletting additions, solution enhancers or dragee components.

The following are examples in accordance with the invention:

*Example I*

18.3 g. of N-methyloctahydrotryptophol are added dropwise to 29 g. of molten diphenylchloroacetylchloride at 50–60° C. Then the mass is heated for about 2¼ hours at 105–110° C. The melt is then taken up in 50 ccm. of acetone and allowed to stand for several hours at 5 to 10° C.

Crude α,α-diphenyl-α-chloro-acetic acid-β-(N-methyloctahydroindolyl-3)-ethylester-hydrochloride crystallizes out, is sucked off, and is recrystallized from acetone. F.P. 115–117° C.

*Example II*

19.7 g. of N-ethyloctahydrotryptophol and 29 g. of diphenylchloroacetylchloride in 200 ccm. of dry toluene are heated under reflux for 3 hours. The reaction mass is thereafter exhaustively extracted with water. The aqueous solution is heated to boiling and then made alkaline on cooling. Upon extraction with ether, the obtained benzylicacid-β-(N-ethyloctahydroindolyl - 3) - ethylester yields the hydrochloride having a F.P. of 123–125° C.

*Example III*

9.1 g. of N-methyloctahydrotryptophol, 24.2 g. of benzilicacid methylester and 5.4 g. of sodium ethylate are heated for 10 hours at 100–110° C. under a pressure of 12 Torr (the term Torr designates 1 mm. of mercury). The still warm reaction mixture is reacted with water and then extracted with ether. After drying and evaporation of the solvent, the mass is then subjected to high vacuum distillation to remove the unreacted N-methyl-octahydrotryptophol; and the residue crystallized from absolute alcohol. The benzilicacid-β-(N-methyloctahy-droindolyl-3)-ethylester melts at 90–91° C.; the hydrochloride has a F.P. of 159–160° C.

*Example IV*

18.4 g. of N-methyloctahydrotryptophol, 37 g. of benz-hydrylbromide and 20.8 g. of potassium carbonate in 200 ccm. of dry toluene are heated under reflux for 4 hours. The reaction mixture is filtered and extracted several times with dilute hydrochloricacid and finally with water. The purified aqueous extract is washed with ether. After drying and evaporation of the solvent there are obtained 25.6 g. of β-(1-methyloctahydroindolyl-3)-ethyl-benz-hydrylether having a boiling point (0.05 mm. at 171–173° C.). The melting point of the fumarate is 131–132° C.

*Example V*

A solution of 4.72 g. of phenylcyclohexylacetylchloride in 15 ccm. of n-hexane and 35 ccm. of benzene is added dropwise, at a temperature of 25° C., to a solution of 4.01 g. N-methyloctahydrotryptamine. After standing for several hours at room temperature, the mixture is heated under reflux for 4 hours. After cooling, the reaction mixture is reacted with 25% hydrochloricacid; the organic phase removed; and the aqueous layer washed with ether. The clear aqueous solution is then made alkaline and exhaustively extracted with ether. After drying and evaporation of the solvent, 7.2 g. of the raw product remain. There is obtained therefrom on recrystallization from petroleum ether, α-phenyl-α-cyclohexyl - aceticacid - β - (N - methyloctahydroindolyl - 3')-ethylamide having a F.P. of 125–126° C.

*Example VI*

15.8 g. of diphenylchloracetylchloride and 12.0 g. of N-methyloctahydrotryptamine are reacted by the method analogous to the method of Example V to produce di-phenylchloroaceticacid - β - (N - methyloctahydroindolyl-3')-ethylamide. The amide is extracted from the benzene-hexane layer with 2n-hydrochloric acid. By briefly heating the hydrochloric acid solution to 100° C., hydrolysis yields the benzilicacid-β-(N-methyloctahydroindolyl-3')-ethylamide having a F.P. of 150–152° C.

*Example VII*

To a solution of 9.15 g. of N-methyloctahydrotryptophol in 50 ccm. of dry ether, there is added, under ice cooling, a solution of 9.45 g. of phenylchloroacetylchloride in 50 ccm. of ether and the mass allowed to stand for 20 hours at room temperature. The oil which separates is heated with 20 ccm. of morpholine in 150 ccm. of benzene for 5 hours under reflux. After cooling, the precipitated morpholinehydrochloride is sucked off; the filtrate concentrated; the residue taken up in 30 ccm. of water; and exhaustively extracted with ether. After drying and evaporation of the ether and distillation of the residual oil, there is obtained α-phenyl-α-morpholinoace- ticacid-β-(N-methyl-octahydroindolyl-3)-ethylester having a boiling point of 198–200° C. at 0.1 Torr.

*Example VIII*

A solution of 18.3 g. of N-methyloctahydrotryptophol in 150 ccm. of toluene are added dropwise to a suspension of 3.9 g. of sodium amide in 25 ccm. of toluene at 25–30° C. Then the mixture is heated for 2 hours under reflux. Upon cooling (the reaction mixture) to room temperature, there is added thereto, dropwise, a solution of 25.9 g. of 1-cyclohexylcyclohexyl-methylbromide in 50 ccm. of dry toluene. The mixture is heated for 6 hours under reflux. Upon cooling, the precipitate is filtered off, and the filtrate evaporated under reduced pressure; and the residue distilled under vacuum. The β-(1-methyloctahydroindolyl - 3) - ethyl - 1 - cyclohexyl-cyclohexyl-methylether boils at 180–182° C./0.05 Torr.

*Example IX*

18.8 g. α-phenyl-α-cyclohexylaceticacid-β-(N-methyl-2,3-dihydroindolyl-3)-ethylester were dissolved in 150 ccm. of methanol containing hydrochloric acid and upon the addition of 4.5 g. of platinum-carbon catalyst shaken up under a pressure of 6 atmospheres and at 50° C. with hydrogen. After 0.15 mol. of hydrogen are taken up, the hydrogenation is discontinued; the solution evaporated and rendered alkaline. The α-phenyl-α-cyclohexyl-aceticacid - β - (N - methyloctahydroindolyl - 3) - ethylester is extracted with ether. After drying and evaporation of the solvent it is distilled. B.P. 175–177° C./0.05 Torr.

*Example X*

19.5 g. of α-phenyl-α-cyclohexylaceticacid-β-(1,5-di-methylindolyl-3)-ethylester were hydrogenated in accordance with the method described in Example IX until it was hydrogenated with 0.2 mol. of hydrogen; and then worked up. There was obtained the α-phenyl-α-cyclohexylaceticacid - β - (1,5 - dimethyloctahydroindolyl-3)-ethylester having a B.P. of 183–185° C./0.05 Torr.

*Example XI*

18.5 g. of α-phenyl-α-cyclohexylaceticacid-β-(octahydroindolyl-3)-ethylester were dissolved in 500 ccm. of 50% methanol. After the addition of 10.5 g. of 35% formaldehyde and 5 g. of previously reduced platinum oxide, hydrogenation was carried out in accordance with normal procedure until 0.05 mol. of hydrogen was taken up. The solvent was evaporated under reduced pressure. By distillation there was obtained α-phenyl-α-cyclohexylaceticacid - β - (N - methyloctahydroindolyl - 3) - ethylester; B.P. 175–177° C./0.05 Torr.

*Example XII*

16.0 g. of phenylglyoxylicacid-β-(N-methyloctahydroindolyl-3)-ethylester were dissolved in 50 ccm. of dry ether. While cooling the same was added dropwise to a Grignard solution prepared from 15.7 g. of bromobenzene. The mass was then heated for 1 hour under reflux. After cooling, there was first added thereto dry ether and finally, it was extracted with diluted hydrochloric acid. The aqueous phase obtained by alkalinizing is extracted with ether; the ethereal extract dried; and concentrated. The residue was recrystallized from absolute alcohol. There was obtained the benzilicacid-β-(N-methylocta-hydroindolyl-3)-ethylester having a F.P. of 90–91° C.

*Example XIII*

3.93 g. of benzilicacid-β-(N-methyloctahydroindolyl-3)-ethylester were dissolved in 20 ccm. of dry ether and reacted with a solution of 5.2 g. of methyliodide in 10 ccm. of ether. On standing at room temperature there crystallized out N,N-dimethyl-3-β-(α',α'-diphenyl-α'-hydroxy)-acetoxy-ethyl-octahydroindolinium-iodide which was removed by suction and recrystallized from absolute alcohol.

Example XIV 1.5 g. of benzilicacid-β-(N-methyloctahydroindolyl-3)-ethylester were dissolved in 20 ccm. of absolute alcohol and reacted with 0.5 g. of 30% hydrogen peroxide. After standing overnight, the N-oxide crystallized out; and was recrystallized from absolute alcohol.

BY THE PROCEDURES ANALOGOUS TO THAT OF THE METHODS DESCRIBED IN EXAMPLES 1 TO 8, THE FOLLOWING COMPOUNDS ARE PREPARED

| Example | Y | $R_1$ | $R_2$ | $R_3$ | $R_4$ | $R_5$ | |
|---|---|---|---|---|---|---|---|
| 15 | $\overset{\mid}{\underset{\mid}{\overset{O}{C}}}\!\!=\!\!O$ | H | $C_2H_5$ | Cl | $C_6H_5$ | $C_6H_5$ | Hydrochloride F.P. 144-145°. |
| 16 | $\overset{\mid}{\underset{\mid}{\overset{O}{C}}}\!\!=\!\!O$ | H | $n\text{-}C_3H_7$ | Cl | $C_6H_5$ | $C_6H_5$ | Hydrochloride, F.P. 132-134°. |
| 17 | $\overset{\mid}{\underset{\mid}{\overset{O}{C}}}\!\!=\!\!O$ | H | $n\text{-}C_3H_7$ | OH | $C_6H_5$ | $C_6H_5$ | Hydrobromide, F.P. 164-165°. |
| 18 | $\overset{\mid}{\underset{\mid}{\overset{O}{C}}}\!\!=\!\!O$ | H | $CH_3$ | H | $C_6H_5$ | Cyclohexyl | B.P. 175-177°, 0.05 Torr. |
| 19 | $\overset{\mid}{\underset{\mid}{\overset{O}{C}}}\!\!=\!\!O$ | 5-$CH_3$ | $CH_3$ | H | $C_6H_5$ | Cyclohexyl | B.P. 174-176°, 0.05 Torr. |
| 20 | $\overset{\mid}{\underset{\mid}{\overset{O}{C}}}\!\!=\!\!O$ | H | $C_2H_5$ | H | $C_6H_5$ | Cyclohexyl | B.P. 185-188°, 0.05 Torr. |
| 21 | $\overset{\mid}{\underset{\mid}{\overset{O}{C}}}\!\!=\!\!O$ | 5-$CH_3$ | $C_2H_5$ | H | $C_6H_5$ | Cyclohexyl | B.P. 184-185°, 0.05 Torr. |
| 22 | $\overset{\mid}{\underset{\mid}{\overset{O}{C}}}\!\!=\!\!O$ | H | $i\text{-}C_4H_9$ | H | $C_6H_5$ | Cyclohexyl | B.P. 190-193°, 0.05 Torr. |
| 23 | $\overset{\mid}{\underset{\mid}{\overset{O}{C}}}\!\!=\!\!O$ | 5-$OCH_3$ | $CH_3$ | H | $C_6H_5$ | Cyclohexyl | B.P. 185-187°, 0.05 Torr. |
| 24 | $\overset{\mid}{\underset{\mid}{\overset{O}{C}}}\!\!=\!\!O$ | H | $CH_3$ | H | —N⟨⟩ | $C_6H_5$ | B.P. 175-178°, 0.05 Torr. |
| 25 | $\overset{\mid}{\underset{\mid}{\overset{O}{C}}}\!\!=\!\!O$ | 5-$CH_3$ | $CH_3$ | H | —N⟨⟩ | $C_6H_5$ | B.P. 188-191°, 0.1 Torr. |
| 26 | $\overset{\mid}{\underset{\mid}{\overset{O}{C}}}\!\!=\!\!O$ | H | $CH_3$ | H | —N⟨⟩ | $C_6H_5$ | B.P. 196-198°, 0.1 Torr. |
| 27 | $\overset{\mid}{\underset{\mid}{\overset{O}{C}}}\!\!=\!\!O$ | H | $C_2H_5$ | H | —N⟨⟩ | $C_6H_5$ | B.P. 197-199°, 0.1 Torr. |
| 28 | $\overset{\mid}{\underset{\mid}{\overset{O}{C}}}\!\!=\!\!O$ | H | $n\text{-}C_3H_7$ | H | $C_6H_5$ | Cyclohexyl | B.P. 194-196°, 0.05 Torr. |
| 29 | $\overset{\mid}{\underset{\mid}{\overset{O}{C}}}\!\!=\!\!O$ | Cl | $CH_3$ | H | $C_6H_5$ | Cyclohexyl | B.P. 183-185°, 0.1 Torr. |
| 30 | $\overset{\mid}{\underset{\mid}{\overset{O}{C}}}\!\!=\!\!O$ | OH | $CH_3$ | H | $C_6H_5$ | Cyclohexyl | B.P. 210-212°, 0.05 Torr. |

NOTE.—In Examples 24 and 25, $R_4$ is piperidino. In Examples 26 and 27, $R_4$ is pyrrolidino.

BY THE PROCEDURES ANALOGOUS TO THAT OF THE METHODS DESCRIBED IN EXAMPLES 1 TO 8, THE FOLLOWING COMPOUNDS ARE PREPARED—Continued

| Example | Y | $R_1$ | $R_2$ | $R_3$ | $R_4$ | $R_5$ | |
|---|---|---|---|---|---|---|---|
| 31 | –O–CO– | H | $CH_3$ | p-Br-$C_6H_4$ | –$C_2H_5$ | –$C_2H_5$ | B.P. 220–222°, 0.05 Torr. |
| 32 | –O–CO– | H | $CH_3$ | $C_6H_5$ | –$CH_2$–$CH_2$–N($CH_3$)–$CH_2$–$CH_2$– | | B.P. 205–207°, 0.05 Torr. |
| 33 | –O–CO– | H | $CH_3$ | $C_6H_5$ | H | thienyl | B.P. 175–176°, 0.05 Torr. |
| 34 | –NH–CO– | H | $CH_3$ | Cl | $C_6H_5$ | $C_6H_5$ | F.P. 136–137°. |
| 35 | –NH–CO– | H | $CH_3$ | H | $C_6H_5$ | $C_6H_5$ | F.P. 125–127°. |
| 36 | –O– | H | $C_2H_5$ | H | $C_6H_5$ | $C_6H_5$ | B.P. 175–176°, 0.05 Torr. |
| 37 | –O– | H | i-$C_3H_7$ | H | $C_6H_5$ | $C_6H_5$ | B.P. 183–185°, 0.05 Torr. |
| 38 | –O– | 5-$CH_3$ | –$CH_3$ | H | $C_6H_5$ | $C_6H_5$ | B.P. 186–188°, 0.05 Torr. |
| 39 | –O– | H | $CH_3$ | H | $C_6H_4$–$CH_3$-p | $C_6H_5$ | B.P. 173–175°, 0.05 Torr. |
| 40 | –O– | H | $CH_3$ | H | $C_6H_4F$-p | $C_6H_5$ | B.P. 198–200°, 0.1 Torr. |
| 41 | –O–$CH_2$–O– | H | $CH_3$ | H | $C_6H_5$ | $C_6H_5$ | B.P. 188–191°, 0.05 Torr. |
| 42 | –NH–CO– | H | $CH_3$ | Cyclohexyl | –$(CH_2)_5$– | | F.P. 140–142°. |
| 43 | –O–$CH_2$– | H | $CH_3$ | Cyclohexyl | –$(CH_2)_5$– | | B.P. 175–176°, 0.05 Torr. |
| 44 | –O–CO– | H | $CH_3$ | $C_6H_5$ | –$CH_2$–$CH_2$–CH=CH–$CH_2$– | | B.P. 177–179°, 0.05 Torr. |
| 45 | –O–CO– | H | $C_2H_5$ | $C_6H_5$ | –$CH_2$–$CH_2$–CH=CH–$CH_2$– | | B.P. 188–190°, 0.05 Torr. |
| 46 | –O–CO– | H | $CH_3$ | $C_6H_5$ | –$(CH_2)_5$– | | B.P. 180–182°, 0.05 Torr. |
| 47 | –O–CO– | H | $C_2H_5$ | $C_6H_5$ | –$(CH_2)_5$– | | B.P. 180–182°, 0.05 Torr. |
| 48 | –O–CO– | H | $CH_3$ | Cyclohexyl | –$(CH_2)_5$– | | B.P. 174–176°, 0.05 Torr. |
| 49 | –O–CO– | H | $C_2H_5$ | Cyclohexyl | –$(CH_2)_5$– | | B.P. 180–183°, 0.05 Torr. |
| 50 | –O–CO– | H | $C_2H_5$ | H | fluorenyl | | B.P. 193–195°, 0.05 Torr. |

The spasmolytic activity of the compounds of this invention have been ascertained in accordance with customary techniques on the isolated small intestine of the rat. The spastic effect was ascertained by the batchwise addition of barium chloride solution (1:25,000) to physiological saline solution in which the organ was suspended. The new compounds (in the form of the hydrochlorides) were added in various concentrations to the bath containing the organ two minutes before the addition of the barium chloride.

The effective dose$_{50}$ (E.D.$_{50}$), i.e., the dose which reduces the barium chloride-induced spasm by 50% were graphically ascertained. The substance employed for making the comparison was the highly spasmolytically active 1-benzyl-3-ethyl-6,7-dimethoxyisoquinoline. The new compounds are markedly superior in spasmolytic action to the mentioned comparison compound.

In the following table are set forth the spasmolytic activity of some of the compounds of this invention, as compared with the activity of the comparison compound.

The activities of the compounds set forth in the table are illustrative of the activities of the compounds of this invention.

| Compound | Activity [1] |
|---|---|
| α-(o-Chlorophenyl)-α-morpholino-aceticacid-β-(1-methyloctahydroindolyl-3)-ethylester | 2 |
| α-(p-Bromophenyl)-α,α-diethylaceticacid-β-(1-methyloctahydroindolyl-3)-ethylester | 3 |
| Diphenylaceticacid-β-(1-methyloctahydroindolyl-3)-ethylester | 3 |
| Diphenylchloroaceticacid-β-(1-methyloctahydroindolyl-3)-ethylester-hydrochloride | 5 |
| Diphenylchloroaceticacid-β-(1-ethyloctahydroindolyl-3)-ethylester-hydrochloride | 10 |
| Phenylcyclohexylaceticacid-β-(1-dimethylaminoethyl-octahydroindolyl-3)-ethylester | 3 |
| Benzilicacid-β-(1-methyloctahydroindolyl-3)-ethylester | 10 |
| β-(N-methyloctahydroindolyl-3)-ethylbenzhydrylether | 7 |
| N-(N'-methyloctahydroindolyl-3)-α-phenyl-α-cyclohexylacetamide | 2 |
| Benzilicacid-β-(1-methyloctahydroindolyl-3)-ethylester-hydrochloride | 9 |
| Phenylcyclohexylaceticacid-β-(1-ethyloctahydroindolyl-3)-ethylester | 3 |
| Phenylpiperidinoaceticacid-β-(1-methyloctahydroindolyl-3)-ethylester | 3 |
| Phenylcyclohexylaceticacid-β-(1-methyloctahydroindolyl-3)-ethylester | 5 |

[1] Activity of the instant compounds compared with the activity of 1-benzyl-3-ethyl-6,7-dimethoxyisoquinoline.

The compounds of this invention have been used clinically in the form of tablets containing 5 mg. of the compound or in ampoules containing 2.5 mg. of the compound. The compounds provide relief from spastic pain in cases of, for example, circulatory disturbances of the vascular system, colic of the urinary system, the biliary system and respiratory system and also in case of angina pectoris.

It will be understood that the foregoing description of the invention and the examples set forth are merely illustrative of the principles thereof. Accordingly, the appended claims are to be construed as defining the invention within the spirit and scope thereof.

We claim:
1. A compound selected from the group consisting of compounds of the formula:

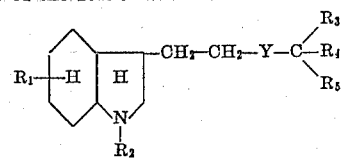

the pharmaceutically acceptable acid addition salts thereof and the corresponding indolinium compounds whereof the quaternizing radical is lower alkyl, wherein:
$R_1$ designates a member of the group consisting of hydrogen, chlorine, hydroxyl, alkyl having at most 5 carbon atoms, methoxy and ethoxy;
$R_2$ designates alkyl having at most 4 carbon atoms;
$R_3$ designates a member of the group consisting of hydrogen, hydroxyl, chlorine, and bromine;
$R_4$ designates a member of the group consisting of phenyl, tolyl, fluororphenyl, chlorophenyl, bromophenyl, morpholino, piperidino and pyrrolidino;
$R_5$ designates a member of the group consisting of phenyl and cyclohexyl, and
when $R_4$ and $R_5$ are linked together, they designate o,o'-biphenylene; and
Y designates a member of the group consisting of

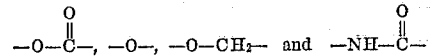

2. α - Phenyl - α - cyclohexylaceticacid - β - (N - ethyl-octahydroindolyl - 3) - ethylester.

3. α - Phenyl - α - cyclohexylaceticacid - β - (N - methyloctahydroindolyl-3)-ethylester.

4. α - Phenyl - α - morpholinoaceticacid - β - (N - methyloctahydroindolyl-3)-ethylester.

5. Benzilicacid-β-(N-ethyl-octahydroindolyl - 3) -ethylester.

6. Benzilicacid - B - (N - methyl - octahydroindolyl-3)-ethylester.

7. 1 - phenyl - 3 - cyclohexene - 1 - carboxylicacid - β-(N-methyl-octahydroindolyl-3')-ethylester.

8. 1 - phenyl - cyclohexane - 1 - carboxylicacid - β-(N-methyl-octahydroindolyl-3')-ethylester.

9. 1 - cyclohexyl - cyclohexane-1-carboxylicacid-β-(N-methyl-octahydroindolyl-3')-ethylester.

10. Fluorene - 9 - carboxylicacid - β - (N-ethyl-octahydroindolyl-3')-ethylester.

11. N - [β - (1 - methyloctahydroindolyl - 3)-ethyl]-benzilicacidamide.

12. N - [β -(1 - methyloctahydroindolyl - 3) - ethyl]-phenylcyclohexylacetamide.

13. β - (1 - methyloctahydroindolyl - 3) - ethyl - benzhydrylether.

14. β - (1 - ethyloctahydroindolyl - 3) - ethyl - benzhydrylether.

No references cited.